United States Patent [19]

Hijikata et al.

[11] Patent Number: 4,758,636
[45] Date of Patent: Jul. 19, 1988

[54] POLYESTER COMPOSITION

[75] Inventors: Kenji Hijikata, Mishima; Toshio Kanoe, Fuji, both of Japan

[73] Assignee: Polyplastics Company, Ltd., Japan

[21] Appl. No.: 933,417

[22] Filed: Nov. 21, 1986

[30] Foreign Application Priority Data

Dec. 6, 1985 [JP] Japan .................................. 60-274695

[51] Int. Cl.$^4$ ....................... C08F 20/00; C08G 63/76
[52] U.S. Cl. ...................................... 525/438; 528/87; 528/100; 528/103; 528/103.5; 528/129; 528/297
[58] Field of Search ................ 528/87, 100, 103, 105, 528/111.3, 111.5, 129, 297; 525/438

[56] References Cited

U.S. PATENT DOCUMENTS 4,177,174  12/1979  Hayashi et al. ...................... 528/100
4,647,605   3/1987  Ando et al. .......................... 523/444

Primary Examiner—Lucille M. Phynes
Attorney, Agent, or Firm—Burns, Doane, Swecker & Mathis

[57] ABSTRACT

A polyester composition comprises (1) a polyester being incapable of further substantial propagation of the chains by heating, being capable of forming the anisotropic phase in the molten state, being capable of the melt-processing and (2) an epoxy compound and is improved in heat resistance.

19 Claims, No Drawings

POLYESTER COMPOSITION

The present invention relates to a stabilized resin composition of melt-processable polyester capable of forming the anisotropic molten phase, said polyester being substantially incapable of any more chain growth upon heating.

A melt-processable polyester capable of forming the anisotropic molten phase is a polymer of comparatively recent development. It attracts attention because of its high strength, high heat-distortion temperature, and high chemical resistance. Where this polymer is to be incorporated with a large amount of filler, it is a common practice to use a polymer of lower molecular weight than usual or to mix polymers of normal molecular weight and lower molecular weight than usual, so as to improve the processability. This practice, however, has a disadvantage that discoloration and decrease of strength take place which are presumably due to thermal decomposition and hydrolysis at the time of heating. This disadvantage is regarded as vital no matter how small the decrease of strength might be, because the polymer is required to have a high level of physical properties and is used under severe conditions.

In order to solve these problems, the present inventors incorporated the above-mentioned polyester with a commonly used stabilizer (antioxidant) such as steric hindrance phenol. This attempt, however, was not successful because the antioxidant sublimes at the high melting point of the polyester.

SUMMARY OF THE INVENTION

The present inventors continued their investigation and unexpectedly found that an epoxy compound, especially the one having at least two epoxy groups in the molecule, suppresses the thermal decomposition of the melt-processable polyester capable of forming the anisotropic molten phase. The present invention was completed on the basis of this finding.

Accordingly, it is an object of the present invention to provide a stabilized polyester resin composition which comprises an epoxy compound and a melt-processable polyester capable of forming the anisotropic molten phase, said polyester being substantially incapable of any more chain growth upon heating.

A polyester composition of the invention comprises (1) a polyester being incapable of further substantial propagation of the chains by heating, being capable of forming the anisotropic phase in the molten state, being capable of the melt-processing and (2) an epoxy compound and is improved in heat resistance. It is preferable that the composition comprises (1) 50 to 99.5 percent by weight of the polyester and (2) 0.5 to 50 percent by weight of the epoxy compound. It is more preferable that the composition comprises (1) 90 to 95 percent by weight of the polyester and (2) 5 to 10 percent by weight of the epoxy compound.

The melt-processable polyester capable of forming the anisotropic molten phase has the property that the polymer chains are regularly oriented in parallel with one another when it is in the molten state. The state in which molecules are oriented as mentioned above is referred to as the liquid crystal state or the nematic phase of a liquid crystal. The polymer like this is usually produced from a monomer which has a thin, long, and flat configuration, has a high rigidity along the long axis of the molecule, and has a plurality of chain extension linkages which are axial or parallel with one another.

The properties of the anisotropic molten phase can be determined by an ordinary polarization test using crossed nicols. More particularly, the properties can be determined with a Leitz polarizing microscope of 40 magnifications by observing a sample placed on a Leitz hot stage in a nitrogen atmosphere. The polymer is optically anisotropic. Namely, it transmits a light when it is placed in between the crossed nicols. When the sample is optically anisotropic, the polarized light can be transmitted through it even in a still state.

The components of the polymer forming the above-mentioned anisotropic molten phase are as follows:
(1) One or more of aromatic and alicyclic dicarboxylic acids,
(2) one or more of aromatic, alicyclic, and aliphatic diols,
(3) one or more of aromatic hydroxycarboxylic acids,
(4) one or more of aromatic thiolcarboxylic acids,
(5) one or more of aromatic dithiols and aromatic thiolphenols, and
(6) one or more of aromatic hydroxyamines and aromatic diamines.

The polymers forming the anisotropic molten phase comprise the following combinations:
(I) a polyester comprising (1) and (2),
(II) a polyester comprising only (3),
(III) a polyester comprising (1), (2), and (3),
(IV) a polythiol ester comprising only (4),
(V) a polythiol ester comprising (1) and (5),
(VI) a polythiol ester comprising (1), (4), and (5),
(VII) a polyester amide comprising (1), (3), and (6), and
(VIII) a polyesteramide comprising (1), (2), (3), and (6).

In addition to the above-mentioned combinations of the components, the polymers forming the anisotropic molten phase include also aromatic polyazomethines such as poly(nitrilo-2-methyl-1,4-phenylenenitriloethylidene-1,4-phenylenethylidine), poly(nitrilo-2-methyl-1,4-phenylenenitrilomethylidine-1,4-phenylenemethylidine) and poly(nitrilo-2-chloro-1,4-phenylenenitrilomethylidine-1,4-phenylenemethylidine).

Further, in addition to the above-mentioned combinations of the components, the polymers forming the anisotropic molten phase include polyester carbonates especially comprising 4-hydroxybenzoyl, dihydroxyphenyl, dihydroxycarbonyl, and terephthaloyl units.

Examples of the compounds constituting the above-mentioned polymers (I) to (VIII) include aromatic dicarboxylic acids such as terephthalic acid, 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, and naphthalene-1,6-dicarboxylic acid; and those substituted with alkyl and alkoxy groups and halogen atoms, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Examples of the alicyclic dicarboxylic acids include trans-1,4-cyclohexanedicarboxylic acid, cis-1,4- cyclohexanedicarboxylic acid, and 1,3-cyclohexanedicarboxylic acid as well as those substituted with alkyl and alkoxy groups and halogen atoms, such as trans-1,4-(1-methyl)cyclohexane dicarboxylic acid and trans-1,4-(1-chloro)cyclohexanedicarboxylic acid.

Examples of the aromatic diols include hydroquinone, resorcinol, 4,4'-dihydroxydiphenyl, 4,4'-dihydroxytriphenyl, 2,6-naphthalenediol, 4,4'-dihydroxydiphenyl ether, bis-(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane as well as those substituted with alkyl and alkoxy groups and halogen atoms, such as chlorohydroquinone, methylhydroquinone, 1-butylhydroquinone, phenylhydroquinone, methoxyhydroquinone, 1-butylhydroquinone, phenylhydroquinone, methoxyhydroquinone, phenoxyhydroquinone, 4-chlororesorcinol, and 4-methylresorcinol.

Examples of the alicyclic diols include trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol as well as those substituted with alkyl and alkoxy groups and halogen atoms, such as trans-1,4-(1-methyl)cyclohexanediol and trans-1,4-(1-chloro)cyclohexanediol.

Examples of the aliphatic diols include straight-chain or branched aliphatic diols such as ethylene glycol, 1,3-propanediol, 1,4-butanediol, and neopentyl glycol.

Examples of the aromatic hydroxycarboxylic acids include 4-hydroxybenzoic acid, 3-hydroxybenzoic acid, 2-hydroxy-2-naphthoic acid, and 6-hydroxy-1-naphthoic acid as well as those substituted with alkyl and alkoxy groups and halogen atoms, such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxy-benzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Examples of the aromatic mercaptocarboxylic acids include 4-mercaptobenzoic acid, 3-mercaptobenzoic acid, 6-mercapto-2-naphthoic acid, and 7-mercapto-2-naphthoic acid.

Examples of the aromatic dithiols include benzene-1,4-dithiol, benzene-1,3-dithiol, 2,6-napthalenedithiol, and 2,7-naphthalenedithiol.

Examples of the aromatic mercaptophenols include 4-mercaptophenol, 3-mercaptophenol, 6-mercaptophenol, and 7-mercaptophenol.

Examples of the aromatic hydroxyamines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxyphenylmethane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), and 4,4'-diaminodiphenyl ether (oxydianiline).

The polymers (I) to (VIII) comprising the above-mentioned components may be divided into a group of those capable of forming the anisotropic molten phase and a group of those incapable of forming said phase according to the constituting components, polymers composition, and sequence distribution. The polymers used in the present invention are limited to those of the former group.

Among the polymers capable of forming the anisotropic molten phase suitably used in the present invention, the polyesters (I), (II), and (III), and polyesteramides (VIII) can be prepared by various ester forming processes wherein organic monomers each having a functional group which can form a desired recurring unit by the condensation are reacted with each other. The functional groups of these organic monomers include carboxyl, hydroxyl, ester, acryloxy, acyl halide, and amine groups. These organic monomers can be reacted by melt acidolysis in the absence of any heat exchange fluid. In this process, the monomers are heated to form a melt. As the reaction proceeds, the solid polymer particles are suspended in the melt. In the final stage of the condensation reaction, the reaction system may be evacuated to facilitate the removal of volatile by-products such as acetic acid and water.

A slurry polymerization process may also be employed in the preparation of fully aromatic polyesters suitable for use in the present invention. In this process, the solid product is obtained in the form of suspension thereof in a heat exchange medium.

In either of said melt acidolysis and slurry polymerization processes, organic monomeric reactants from which fully aromatic polyesters can be derived may be employed in the reaction in a modified form obtained by esterifying the hydroxyl group of the monomer at ambient temperature (i.e., in the form of their lower acyl esters). The lower acyl groups have preferably about 2 to 4 carbon atoms. Preferably, acetates of the organic, monomeric reactants are employed in the reaction.

Typical examples of the catalysts usable in both of the melt acidolysis and slurry processes include dialkyltin oxides (such as dibutyltin oxide), dilauryltin oxide, titanium idoxide, titanium dioxide, antimony trioxide, alkoxytitanium silicates, titanium alkoxides, alkali metal and alkaline earth metal salts of carboxylic acids (such as zinc acetate), Lewis acids (such as $BF_3$), and gaseous acid catalysts such as hydrogen halides (e.g., HCl). The catalyst is used in an amount of generally about 0.001 to 1 wt%, particularly about 0.01 to 0.2 wt%, based on the monomer.

The fully aromatic polymers suitable for use in the present invention are substantially insoluble in ordinary solvents and, therefore, they are unsuitable for use in a solution processing process. However, as described above, these polymers can be processed easily by an ordinary melt processing process. Particularly preferred fully aromatic polymers are soluble in pentafluorophenol to some extent.

The fully aromatic polyester preferably used in the present invention have a weight-average molecular weight of generally about 2,000 to 200,000, preferably about 10,000 to 50,000, particularly about 20,000 to 25,000. The fully aromatic polyesteramides preferably used have a molecular weight of generally about 5,000 to 50,000, preferably about 10,000 to 30,000, for example, 15,000 to 17,000. The molecular weight may be determined by gel permeation chromatography or other standard methods in which no polymer solution is formed, such as a method in which terminal groups of a compression-molded film are determined by infrared spectroscopy. In another method, the molecular weight of the polymer may be determined according to a light-scattering method after it is dissolved in pentafluorophenol.

When the fully aromatic polyester or polyesteramide is dissolved in pentafluorophenol at 60° C. to obtain a 0.1 wt% solution thereof, the solution has generally an inherent viscosity (I.V.) of at least about 2.0 dl/g, for example, about 2.0 to 10.0 dl/g.

The anisotropic molten phase-forming polyesters used particularly preferably in the present invention are those containing at least about 10 molar % of a naphthalene moiety-containing recurring unit such as 6-hydroxy-2-naphthoyl, 2,6-dihydroxynaphthalene, and 2,6-dicarboxynaphthalene. Preferred polyesteramides are those having a recurring unit comprising the above-mentioned naphthalene moiety and 4-aminophenol or 1,4-phenylenediamine moiety. Examples of them will now be described.

(1) Polyesters essentially comprising the following recurring units I and II:

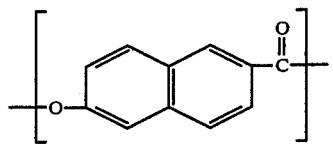

I

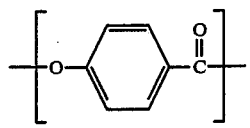

II

These polyesters comprise about 10 to 90 molar % of unit I and about 10 to 90 molar % of unit II. In one embodiment, unit I is contained in an amount of about 65 to 85 molar %, preferably about 70 to 80 molar % (for example, about 75 molar %). In another embodiment, unit II is contained in an amount of as small as about 15 to 35 molar %, preferably about 20 to 30 molar %. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

(2) Polyesters essentially comprising the following recurring units I, II, and III:

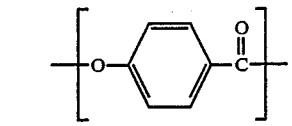

I

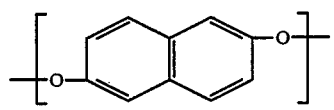

II

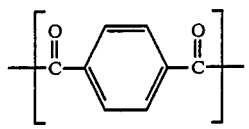

III

These polyesters contain about 30 to 70 molar % of unit I. They comprise preferably about 40 to 60 molar % of unit I, about 20 to 30 molar % of unit II, and about 20 to 30 molar % of unit III. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

(3) Polyesters essentially comprising the following recurring units I, II, III, and IV.

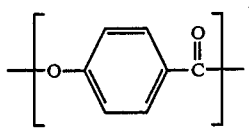

I

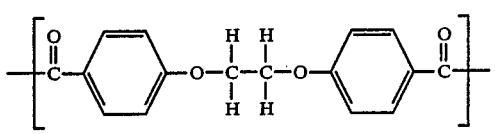

II

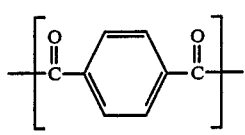

III

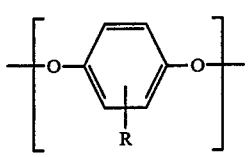

IV (wherein R represents a substituent for the hydrogen atom bound to the aromatic ring which is methyl, chlorine, bromine, or a combination of them.) These polyesters contain about 20 to 60 molar % of unit I, about 5 to 18 molar % of unit II, about 5 to 35 molar % of unit III, and about 20 to 40 molar % of unit IV. Preferably, they comprise about 35 to 45 molar % of unit I, about 10 to 15 molar % of unit II, about 15 to 25 molar % of unit III, and about 25 to 35 molar % of unit IV, with the proviso that the total molar concentration of units II and III is substantially equal to the molar concentration of unit IV. At least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them. When the fully aromatic polyester is dissolved in pentafluorophenol at 60° C. to obtain a 0.3 w/v% solution thereof, the solution has generally an inherent viscosity of at least 2.0 dl/g, for example, 2.0 to 10.0 dl/g.

(4) Polyesters essentially comprising the following recurring units I, II, III, and IV:

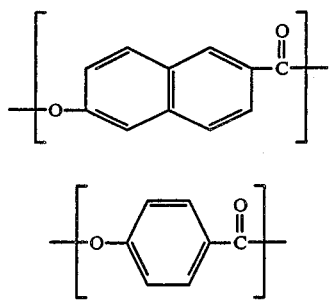

III dioxyaryl units of the general formula: [—O—Ar—O—] wherein Ar represents a divalent group having at least one aromatic ring, IV dicarboxyaryl units of the general formula:

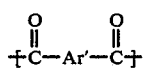

wherein Ar' represents a divalent group having at least one aromatic ring.

The amount of unit I is about 20 to 40 molar %. The amount of unit II is larger than 10 molar % but up to about 50 molar %. The amount of unit III is larger than 5 molar % but up to about 30 molar % and that of unit IV is larger than 5 molar % but up to 30 molar %. These polyesters comprise preferably about 20 to 30 molar % (for example, about 25 molar %) of unit I, about 25 to 40 molar % (for example, about 35 molar %) of unit II, about 15 to 25 molar % (for example, about 20 molar %) of unit III and about 15 to 25 molar % (for example, about 20 molar %) of unit IV. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them. The units III and IV are preferably symmetrical. More particularly, divalent bonds which connect the unit III or IV with adjacent units are arranged symmetrically on one or more aromatic rings (for example, when they are on a naphthalene ring, they are arranged in positions para to each other or on diagonal rings). However, asymmetrical units derived from resorcinol and isophthalic acid may also be used.

A preferred dioxyaryl unit II is as follows:

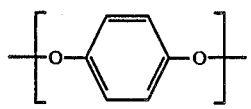

and a preferred dicarboxyaryl unit IV is as follows:

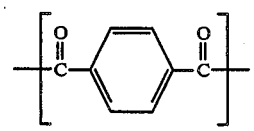

(5) Polyesters essentially comprising the following recurring units I, II, and III:

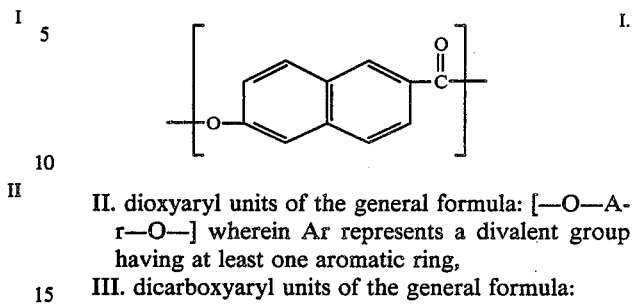

II. dioxyaryl units of the general formula: [—O—Ar—O—] wherein Ar represents a divalent group having at least one aromatic ring, III. dicarboxyaryl units of the general formula:

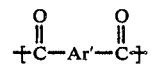

wherein Ar' represents a divalent group having at least one aromatic ring.

The amounts of units I, II, and III are about 10 to 90 molar %, 5 to 45 molar %, and 5 to 45 molar %, respectively. These polyesters comprise preferably about 20 to 80 molar % of unit I, about 10 to 40 molar % of unit II, and about 10 to 40 molar % of unit III. More preferably, they comprise about 60 to 80 molar % of unit I, about 10 to 20 molar % of unit II, and about 10 to 20 molar % of unit III. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atom, a phenyl group, substituted phenyl groups, and combinations of them.

A preferred dioxyaryl unit II is as follows:

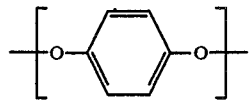

and a preferred dicarboxyaryl unit III is as follows:

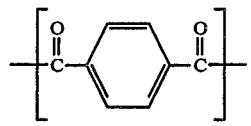

(6) Polyesteramides essentially comprising the following recurring units I, II, III, and IV:

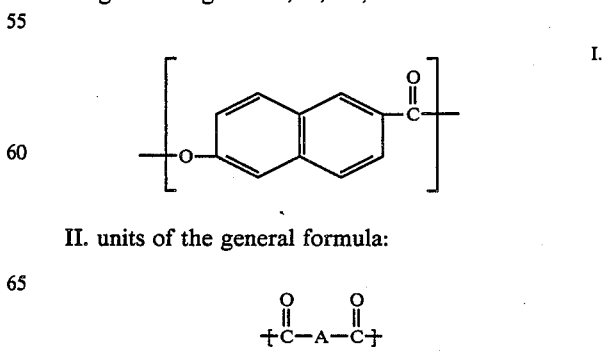

II. units of the general formula:

wherein A represents a divalent group having at least one aromatic ring or a divalent transcyclohexane group, III. units of the general formula: ─{Y─Ar─Z}─
wherein Ar represents a divalent group having at least one aromatic ring, Y represent O, NH or Nr, and Z represents NH or NR, R being an alkyl group having 1 to 6 carbon atoms or an aryl group, IV. units of the general formula: ─{O─Ar'─O}─
wherein Ar' represents a divalent group having at least one aromatic ring.

The amounts of units I, II, III, and IV are about 10 to 90 molar %, about 5 to 45 molar %, about 5 to 45 molar %, and about 0 to 40 molar %, respectively. If necessary, at least part of the hydrogen atoms bound directly to the ring may be replaced with a substituent selected from the group consisting of alkyl groups having 1 to 4 carbon atoms, alkoxy groups having 1 to 4 carbon atoms, halogen atoms, a phenyl group, substituted phenyl groups, and combinations of them.

A preferred dicarboxyaryl unit II is as follows:

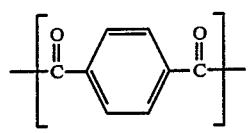

a preferred unit III is as follows:

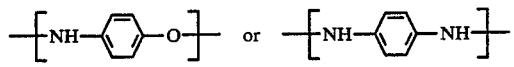

and a preferred dioxyaryl unit IV is as follows:

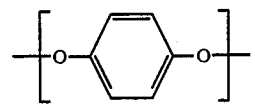

The anisotropic molten phase-forming polymers of the present invention include also those wherein part of a polymer chain comprises a segment of the above-mentioned anisotropic molten phase-forming polymer and the balance comprises a segment of a thermoplastic resin which does not form an anisotropic molten phase.

The epoxy compound used in this invention is one which has at least one epoxy group, preferably two or more epoxy groups, in the molecule. It should be relatively non-volatile under the condition of compounding and processing the above-mentioned melt-processable polyester; therefore, it should preferably be selected from those having a molecular weight higher than 250. The one in powder form having a high degree of polymerization is preferable.

Preferred examples include epoxy compounds of glycerin type, tetraglycidyl ether type, dimer and trimer acid type, polyglycol type, novolak type, bisphenol derivative type, cyclic type, and aliphatic type. Typical examples are listed below.

(1) Glycerin type:

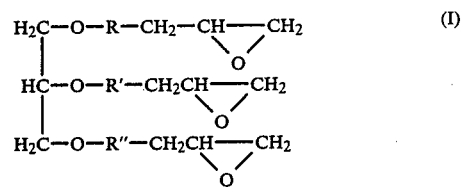

(2) Tetraglycidyl ether type:

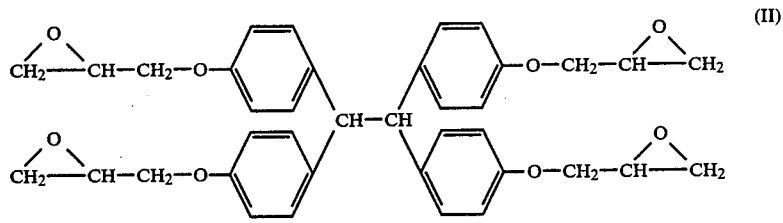

(3) Dimer and trimer acid type:

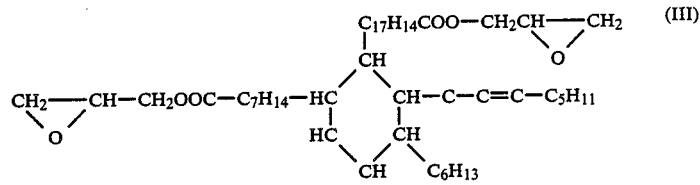

(4) Polyglycol type:

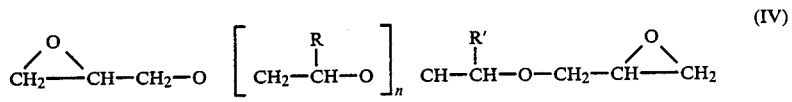

(5) Novolak type:

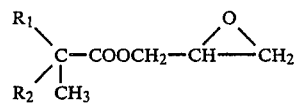
(V)

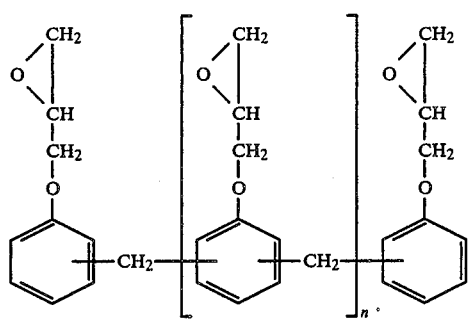

(6) Bisphenol derivative type:

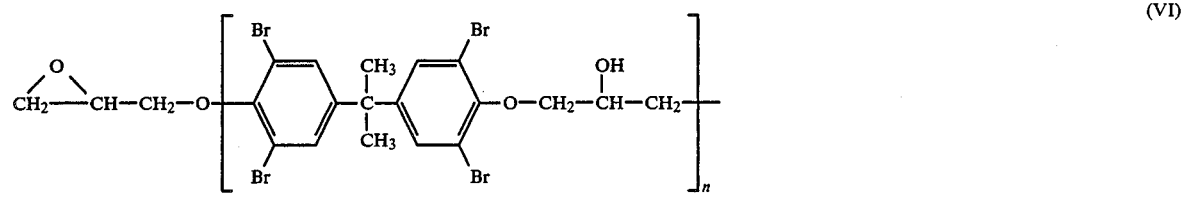
(VI)

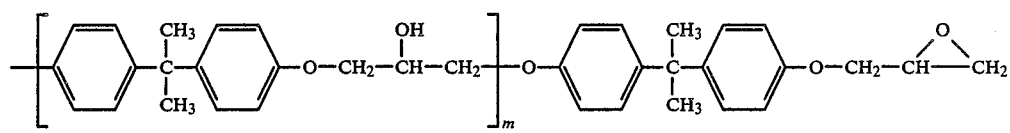

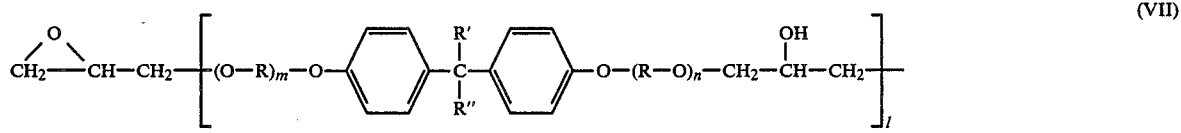
(VII)

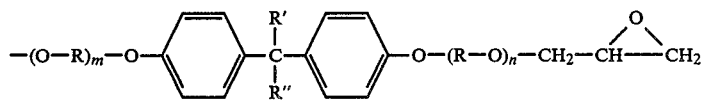

(7) Cyclic type:

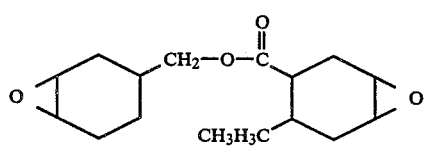
(VIII)

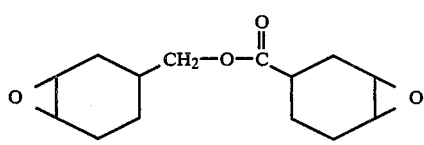
(IX)

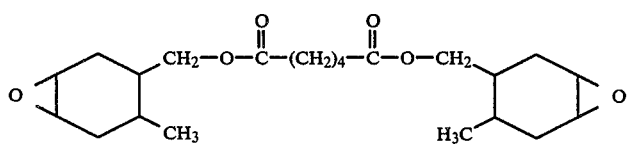
(X)

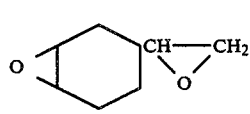
(XI)

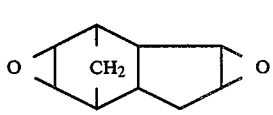
(XII)

(8) Aliphatic epoxy type:

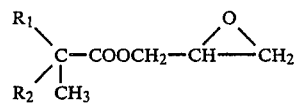
(XIII)

(where $R_1$ and $R_2$ are aliphatic groups each having 7 to 9 carbon atoms in total.)

Preferable among these examples are epoxy compounds of bisphenol derivative type and novolak type because of their miscibility with the polyester.

The composition of this invention contains the above-mentioned epoxy compound as a stabilizer in an effective amount. The amount of the polyfunctional epoxy compound stabilizer added to the composition is usually 0.5 to 50 wt%, preferably 2 to 20 wt%, more preferably 5 to 10 wt%, and particularly 7 to 8 wt%.

The composition of this invention may be incorporated with other stabilizers such as antioxidant (e.g., steric hindrance phenol and phosphite) and UV light absorber.

The composition of this invention may be incorporated further with other additives such as chelating agent, carbon black, plasticizer, color stabilizer, dye, pigment, filler, and flame retardant.

EXAMPLES

The invention is now illustrated by the following examples, which are not intended to limit the scope of the invention. The performance was evaluated according to the following test methods.

Test Methods (1) Change of physical properties by heat aging

The tensile specimens of each sample were allowed to stand at 300° C. for 30 minutes in the air, and then their tensile strength and I.V. values were measured.

(2) Evolution of gas resulting from thermal decomposition 2 g of sample pellets held in a 100-cc container was heated in a furnace at 350° C. for 30 minutes, with the atmosphere replaced with helium. The gas in the container was analyzed.

(3) Change of physical properties by hydrolysis

Tensile specimens of each sample were aged in steam at 135° C., under 2 atm, for 300 hours, and then the tensile strength and I.V. value were measured.

The tensile strength was measured according to ASTM D-638. The I.V. value (Intrinsic Viscosity) was measured as follows: The sample was crushed and dissolved in pentachlorophenol at 100° C. over 8 hours. The viscosity of the solution was measured with an Ostwald viscometer, and the I.V. value was calculated from the viscosity.

EXAMPLES 1 TO 6

The following five polymers A, B, C, D, and E were used in Examples 1 to 5, and a mixture of polymers A and E was used in Example 6. 100 parts by weight of each polymer was incorporated with 6 parts by weight of epoxy resin (in powder form) of bisphenol derivative type represented by the structural formula (VI) above (n=0, m=12, sp. gr.=1.190, m.p.=144° to 158° C., and epoxy equivalent=2400 to 3000). The resulting mixture was pelletized at 290° C. in the usual way using an extruder. The pellets and the test pieces produced from the pellets by injection molding were tested according to the above-mentioned test methods. The results are shown in Table 1.

Polymer Samples

The polymers A, B, C, D, and E capable of forming the anisotropic molten phase which were used in the examples have the following structural units.

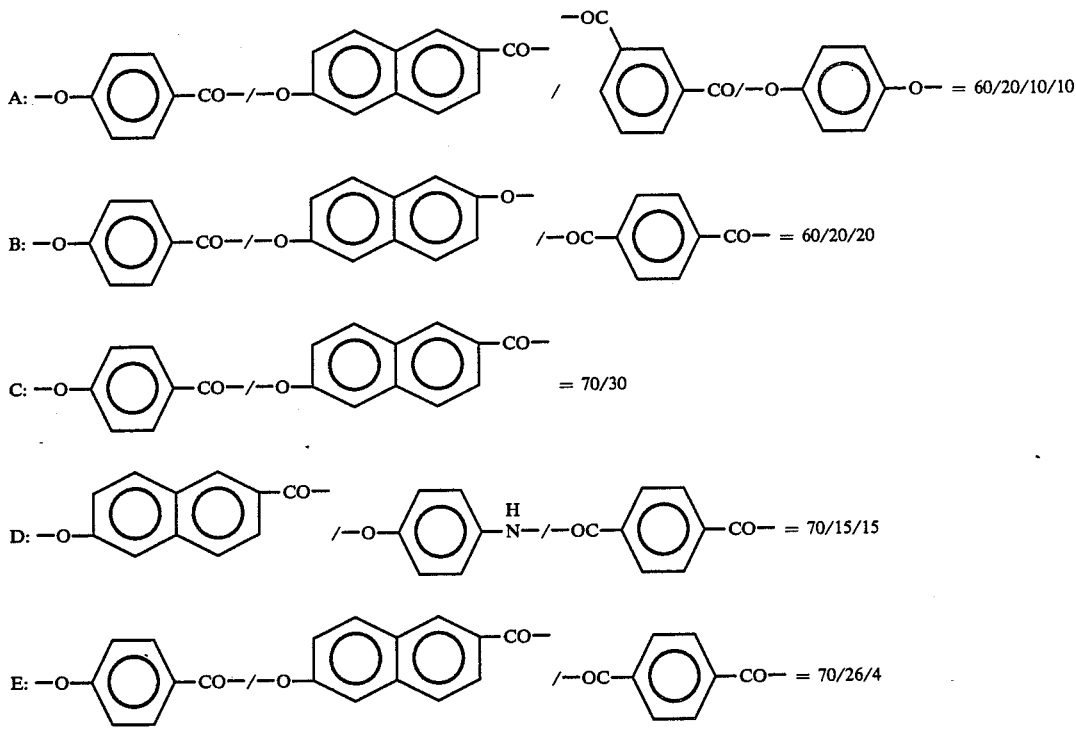

The above-mentioned resins A, B, C, D, and E are produced in the following manner.

Resin A 1081 parts (by weight, the same shall apply hereinafter) of 4-acetoxybenzoic acid, 460 parts of 6-acetoxy-2-naphthoic acid, 166 parts of isophthalic acid, and 194 parts of 1,4-diacetoxybenzene were fed to a reactor provided with a stirrer, a nitrogen inlet tube, and a distillation tube. The mixture was heated to 260° C. in nitrogen stream and stirred violently at that temperature for 2.5 h and then at 280° C. for 3 h while acetic acid was distilled off from the reactor. The temperature was elevated to 320° C. and nitrogen introduction was stopped. The pressure in the reactor was reduced gradually to 0.1 mmHg after 15 min. The mixture was stirred at that temperature under that pressure for 1 h.

The obtained polymer had an intrinsic viscosity of 5.0 as determined in pentafluorophenol at a concentration of 0.1 wt% at 60° C.

Resin B 1081 parts of 4-acetoxybenzoic acid, 489 parts of 2,6-diacetoxynaphthalene, and 332 parts of terephthalic acid were fed to a reactor provided with a stirrer, a nitrogen inlet tube, and a distillation tube. The mixture was heated to 250° C. in nitrogen stream and stirred violently at that temperature for 2 h and then at 280° C. for 2.5 h while acetic acid was distilled off from the reactor. The temperature was elevated to 320° C. and the nitrogen introduction was stopped. The pressure in the reactor was reduced gradually to 0.2 mmHg after 30 min. The mixture was stirred at that temperature under that pressure for 1.5 h.

The obtained polymer had an intrinsic viscosity of 2.5 as determined in pentafluorophenol at a concentration of 0.1 wt% at 60° C.

Resin C 1261 parts of 4-acetoxybenzoic acid 691 parts of 6-acetoxy-2-naphthoic acid were placed in a reactor provided with a stirrer, a nitrogen inlet tube, and a distillation tube. The mixture was heated to 250° C. in nitrogen stream and stirred violently at that temperature for 3 h and then at 280° C. for 2 h while acetic acid was distilled off from the reactor. The temperature was elevated to 320° C. and the nitrogen introduction was stopped. The pressure in the reactor was reduced gradually to 0.1 mmHg after 20 min. The mixture was stirred at that temperature under that pressure for 1 h.

The obtained polymer had an intrinsic viscosity of 5.4 as determined in pentafluorophenol at a concentration of 0.1 wt% at 60° C.

Resin D 1612 parts of 6-acetoxy-2-naphthoic acid, 290 parts of 4-acetoxyacetanilide, 249 parts of terephthalic acid, and 0.4 parts of sodium acetate were placed in a reactor provided with a stirrer, a nitrogen inlet tube, and a distillation tube. The mixture was heated to 250° C. in nitrogen stream and stirred violently at that temperature for 1 h and then at 300° C. for 3 h while acetic acid was distilled off from the reactor. The temperature was elevated to 340° C. and the nitrogen introduction was stopped. The pressure in the reactor was reduced gradually to 0.2 mmHg after 30 min. The mixture was stirred at that temperature under that pressure for 30 min.

The obtained polymer had an intrinsic viscosity of 3.9 as determined in pentafluorophenol at a concentration of 0.1 wt% at 60° C.

Resin E 1256 parts of 4-acetoxybenzoic acid, 639 parts of 6-acetoxy-2-naphthoic acid, and 94 parts of terephthalic acid were fed to a reactor provided with a stirrer, a nitrogen inlet tube, and a distillation tube. The mixture was heated to 250° C. in nitrogen stream and stirred violently at that temperature for 3 h and then at 280° C. for 3 h while acetic acid was distilled off from the reactor. The temperature was elevated to 320° C. and the nitrogen introduction was stopped. The pressure in the reactor was reduced gradually to 0.1 mmHg after 20 min. The mixture was stirred at that temperature under that pressure for 1 h.

The obtained polymer had an intrinsic viscosity of 0.77 as determined in pentafluorophenol at a concentration of 0.1 wt% at 60° C.

COMPARATIVE EXAMPLES 1 TO 6

The same procedure as in Examples 1 to 6 was repeated except that the epoxy compound was not added. The physical properties of the samples were measured. The results are shown in Table 1.

EXAMPLE 7

The same procedure as in Example 6 was repeated except that the epoxy compound was replaced by 6 parts of epoxidized linseed oil, which is an epoxidized unsaturated triglyceride. The physical properties of the sample were measured. The results are shown in Table 1.

EXAMPLE 8

The same procedure as in Example 6 was repeated except that the epoxy compound was replaced by the epoxy novolak phenol represented by the structural formula (V) (n=1.6, sp. gr.=1.23, epoxy equivalent=176 to 181). The physical properties of the sample were measured. The results are shown in Table 1.

COMPARATIVE EXAMPLE 7

The same procedure as in Example 6 was repeated except that the epoxy compound was replaced by 0.5 parts by weight of triethylene glycol bis-3-(3-t-butyl-4-hydroxy-5-methylphenyl)propionate, which is a steric hindrance phenol (trade name: Irganox 245). The physical properties of the sample were measured. The results are shown in Table 1.

TABLE 1

| Example | Kind of polymer *1 | Amount added *2 | Pyrolysis $CO_2$ (vol %) | Before heat aging Tensile strength (kg/cm$^2$) | I.V. value | After heat aging Tensile strength (kg/cm$^2$) | I.V. value | After hydrolysis Tensile strength (kg/cm$^2$) | I.V. value *3 |
|---|---|---|---|---|---|---|---|---|---|
| 1* | A (100) | — | 4.0 | 1631 | 5.0 | 7436 | 4.4 (88) | 1404 | 4.3 (85) |
| 1 | A (100) | S (6) | 2.4 | 1631 | 5.1 | 1469 | 4.7 (93) | 1458 | 4.6 (90) |
| 2* | B (100) | — | 4.0 | 1577 | 2.5 | 1436 | 2.3 (90) | 1393 | 2.2 (87) |
| 2 | B (100) | S (6) | 2.4 | 1588 | 2.6 | 1480 | 2.4 (92) | 1458 | 2.4 (92) |
| 3* | C (100) | — | 3.2 | 1782 | 5.4 | 1609 | 4.9 (91) | 1620 | 4.8 (89) |
| 3 | C (100) | S (6) | 2.1 | 1782 | 5.6 | 1696 | 5.3 (94) | 1674 | 5.2 (92) |
| 4* | D (100) | — | 3.5 | 1685 | 3.9 | 1588 | 3.6 (92) | 1577 | 3.4 (87) |
| 4 | D (100) | S (6) | 2.2 | 1674 | 4.1 | 1620 | 3.9 (95) | 1631 | 3.8 (93) |
| 5* | E (100) | — | 8.1 | 421 | 0.78 | 324 | 0.60 (77) | 281 | 0.46 (59) |
| 5 | E (100) | S (6) | 6.5 | 432 | 0.83 | 367 | 0.70 (85) | 346 | 0.58 (70) |
| 6* | A (70) E (30) | — | 6.0 | 1318 | 2.9 | 1199 | 2.2 (76) | 1058 | 1.9 (66) |
| 6 | A (70) E (30) | S (6) | 4.1 | 1350 | 3.1 | 1318 | 2.9 (90) | 1188 | 2.5 (79) |
| 7 | A (70) E (30) | R (6) | 4.2 | 1350 | 3.1 | 1307 | 2.6 (85) | 1188 | 2.3 (74) |
| 8 | A (70) E (30) | N (6) | 4.1 | 1350 | 3.1 | 1318 | 2.8 (90) | 1188 | 2.5 (80) |
| 7* | A (70) | T (0.5) | 4.9 | 1318 | 2.9 | 1253 | 2.6 (85) | 1058 | 1.9 (66) |

TABLE 1-continued

| Example | Kind of polymer *1 | Amount added *2 | Pyrolysis $CO_2$ (vol %) | Before heat aging | | After heat aging | | After hydrolysis | |
|---|---|---|---|---|---|---|---|---|---|
| | | | | Tensile strength (kg/cm$^2$) | I.V. value | Tensile strength (kg/cm$^2$) | I.V. value | Tensile strength (kg/cm$^2$) | I.V. value *3 |
| | E (30) | | | | | | | | |

*Comparative Example

Note to Table 1

*1 Parenthesized figures are in parts by weight.

*2 S: bisphenol type epoxy compound (Formula VI); R: epoxidized linseed oil; N: novolak type epoxy compound (Formula V); and T: Irganox 245. Figures are in parts by weight for 100 parts by weight of polymer.

*3 Parenthesized figures denote the retention.

The embodiments of the invention in which an exclusive property of privilege is claimed are defined as follows:

1. A melt-processable composition of improved thermal stability comprising (a) 80 to 98 percent by weight of a melt-processable polyester which is capable of forming an anisotropic melt phase, and (b) approximately 2 to 20 percent by weight of an epoxy compound, wherein said epoxy compound renders said component (a) incapable of substantial chain growth upon heating.

2. A melt-processable composition of improved thermal stability according to claim 1 wherein said epoxy compound has at least two epoxy groups.

3. A melt-processable composition of improved thermal stability according to claim 1 wherein said epoxy compound has an average molecular weight of at least 250.

4. A melt-processable composition of improved thermal stability according to claim 1 comprising (a) 90 to 95 percent by weight of said melt-processable polyester which is capable of forming an anisotropic melt phase, and (b) 5 to 10 percent by weight of said epoxy compound.

5. A melt-processable composition of improved thermal stability according to claim 1 wherein said melt-processable polyester which is capable of forming an anisotropic melt phase contains at least approximately 10 molar percent of naphthalene units.

6. A melt-processable composition of improved thermal stability according to claim 5 wherein said naphthalene units of said melt-processable polyester which is capable of forming an anisotropic melt phase are selected from the group consisting of 6-hydroxy-2-naphthoyl, 2,6-dioxynaphthalene, and 2,6-dicarboxynaphthalene.

7. A melt-processable composition of improved thermal stability according to claim 1 wherein said melt-processable polyester which is capable of forming an anisotropic melt phase exhibits an inherent viscosity of at least 2.0 dl./g. when dissolved in a concentration of 0.1 percent by weight in pentafluorophenol at 60° C.

8. A melt-processable composition of improved thermal stability according to claim 1 wherein said melt-processable polyester which is capable of forming an anisotropic melt phase exhibits an inherent viscosity of approximately 2.0 to 10.0 dl./g. when dissolved in a concentration of 0.1 percent by weight in pentafluorophenol at 60° C.

9. A melt-processable composition of improved thermal stability according to claim 1 wherein said melt-processable polyester which is capable of forming an anisotropic melt phase is a polyester which consists essentially of the recurring moieties I and II which may include substitution of at least some of the hydrogen atoms present upon an aromatic ring wherein:

I is

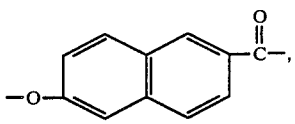

and

II is

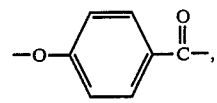

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 molar percent of moiety I, and approximately 10 to 90 molar percent of moiety II.

10. A melt-processable composition of improved thermal stability according to claim 1 wherein said melt-processable polyester which is capable of forming an anisotropic melt phase is a polyester which consists essentially of recurring moieties I, II and III where:

I is

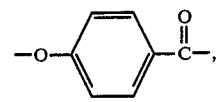

II is

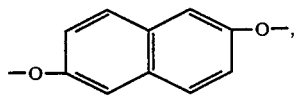

and

III is

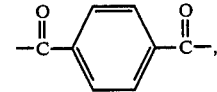

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 30 to b 70 molar percent of moiety I.

11. A melt-processable composition of improved thermal stability according to claim 10 wherein moiety I is present in a concentration of about 40 to 60 molar percent, moiety II is present in a concentration of about 20 to 30 molar percent, and moiety III is present in a concentration of about 20 to 30 molar percent.

12. A melt-processable composition of improved thermal stability according to claim 1 wherein said melt-processable polyester which is capable of forming an anisotropic melt phase is a polyester which consists essentially of the recurring moieties I, II, III and IV wherein:

I is

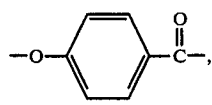

II is

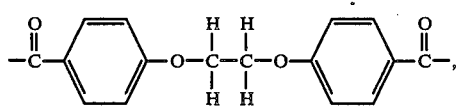

III is

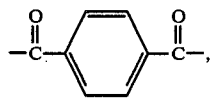

and
IV is

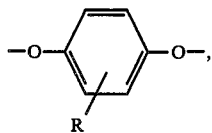

where R is methyl, chloro, bromo, and mixtures thereof, and is substituted for a hydrogen atom present upon the aromatic ring, and wherein the polyester comprises about 20 to 60 molar percent of moiety I, about 5 to 18 molar percent of moiety II, about 5 to 35 molar percent of moiety III, and about 20 to 40 molar percent of moiety IV.

13. A melt-processable composition of improved thermal stability according to claim 12 wherein moiety I is present in a concentration of abut 35 to 45 molar percent, moiety II is present in a concentration of about 10 to 15 molar percent, moiety III is present in a concentration of about 15 to 25 molar percent, and moiety IV is present in a concentration of about 25 to 35 molar percent.

14. A melt-processable composition of improved thermal stability according to claim 1 wherein said melt-processable polyester which is capable of forming an anisotropic melt phase is a polyester which consists essentially of moieties I, II, III and IV which may include substitution of at least some of the hydrogen atoms present upon an aromatic ring wherein:

I is

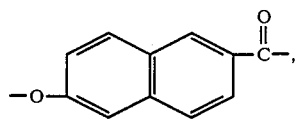

II is

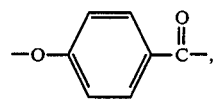

III is a dixoyaryl moiety of the formula —O—A-R—O— wherein Ar is a divalent radical having at least one aromatic ring, and IV is a dicarboxyaryl moiety of the formula

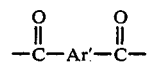

wherein Ar' is a divalent radical having at least one aromatic ring, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 20 to 40 molar percent of moiety I, in excess of 10 molar percent but less than about 50 molar percent of moiety II, in excess of 5 molar percent but less than about 30 molar percent of moiety III, and in excess of 5 molar percent but less than 30 molar percent of moiety IV.

15. A melt-processable composition of improved thermal stability according to claim 14 wherein wherein moiety I is present in a concentration of about 20 to 30 molar percent, moiety II is present in a concentration of about 25 to 40 molar percent, moiety III is present in a concentration of about 15 to 25 molar percent, and moiety IV is present in a concentration of about 15 to 25 molar percent.

16. A melt-processable composition of improved thermal stability according to claim 1 wherein said melt-processable polyester which is capable of forming an anisotropic melt phase is a polyester which consists essentially of recurring moieties I, II, and III which may include substitution of at least some of the hydrogen atoms present upon an aromatic ring wherein:

I is

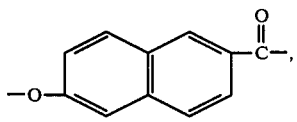

II is a dioxyaryl moiety of the formula —O—A-r—O— wherein Ar is a divalent radical having at least one aromatic ring, and III is a dicarboxyaryl moiety of the formula

wherein Ar' is a divalent radical having at least one aromatic ring,
with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 10 to 90 molar percent of moiety I, about 5 to 45 molar percent of moiety II, and about 5 to 45 molar percent of moiety III.

17. A melt-processable composition of improved thermal stability according to claim 16 wherein moiety I is present in a concentration of about 20 to 80 molar percent, moiety II is present in a concentration of about 10 to 40 molar percent, and moiety III is present in a concentration of about 10 to 40 molar percent.

18. A melt-processable composition of improved thermal stability according to claim 1 wherein said melt-processable polyester which is capable of forming an anisotropic melt phase is a poly(ester-amide) which consists essentially of recurring moiety I, II, and III, and optionally IV, wherein:

I is

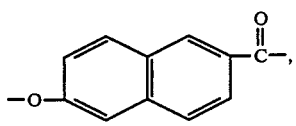

II is

where A is a divalent radical having at least one aromatic ring or a divalent transcyclohexane radical, III is —Y—Ar—Z— wherein Ar is a divalent radical having at least one aromatic ring, Y is O, NH, or NR, and Z is NH or NR, where R is an alkyl group having 1 to 6 carbon atoms or an aryl group, and IV is —O—Ar'—O— wherein Ar' is a divalent radical having at least one aromatic ring, with said optional substitution if present being selected from the group consisting of an alkyl group of 1 to 4 carbon atoms, and alkoxy group of 1 to 4 carbon atoms, halogen, phenyl, substituted phenyl, and mixtures of the foregoing, and wherein said poly(ester-amide) comprises about 10 to 90 molar percent of moiety I, about 5 to 45 molar percent of moiety II, about 5 to 45 molar percent of moiety III, and about 0 to 40 molar percent of moiety IV.

19. A melt-processable composition of improved thermal stability according to claim 18 wherein moiety I is present in a concentration of about 70 molar percent, moiety II is

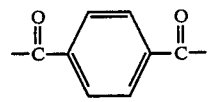

and is present in a concentration of about 15 molar percent, moiety III is

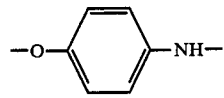

and is present in a concentration of about 15 molar percent, and moiety IV is substantially absent.

* * * * *